(12) United States Patent
Baer et al.

(10) Patent No.: US 7,974,948 B2
(45) Date of Patent: Jul. 5, 2011

(54) AUTOMATICALLY CAPTURING AND MAINTAINING VERSIONS OF DOCUMENTS

(75) Inventors: Peter Baer, Seattle, WA (US); Simon Clarke, Seattle, WA (US); David John Rasmussen, Redmond, WA (US); Ilya Koulchin, Redmond, WA (US); David Christopher Tse, Redmond, WA (US); Olga Veselova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 12/114,823

(22) Filed: May 5, 2008

(65) Prior Publication Data

US 2009/0276471 A1 Nov. 5, 2009

(51) Int. Cl.
*G06F 17/30* (2006.01)
(52) U.S. Cl. .......................... 707/638; 707/695
(58) Field of Classification Search .................. 707/610, 707/638, 695, 999.203; 715/224, 225, 254, 715/255, 260, 271
See application file for complete search history.

(56) References Cited

U.S. PATENT DOCUMENTS

| | | | |
|---|---|---|---|
| 5,806,078 A | 9/1998 | Hug et al. | |
| 5,909,689 A | 6/1999 | Van Ryzin | |
| 6,341,291 B1 | 1/2002 | Bentley et al. | |
| 6,596,030 B2 | 7/2003 | Ball et al. | |
| 7,062,497 B2 * | 6/2006 | Hamburg et al. | 1/1 |
| 7,231,410 B1 | 6/2007 | Walsh et al. | |
| 7,340,534 B2 * | 3/2008 | Cameron et al. | 709/246 |
| 2006/0161516 A1 | 7/2006 | Clarke et al. | |
| 2006/0206547 A1 | 9/2006 | Kulkarni et al. | |
| 2007/0150433 A1 | 6/2007 | Chen | |

FOREIGN PATENT DOCUMENTS

WO   WO2007135688 A2   11/2007

OTHER PUBLICATIONS

"AutoSave: Automated Manufacturing Source Security and Change Control", 1987-2007, MDT Inc., pp. 4.
"Simulink: Managing Model Versions", 1984-2008, The MathWorks Inc, pp. 9.
"AutoSave2", Version 2.017, Avanquest Software, retrieved Jan. 8, 2008 from http://shop.avanquest.com/usa/prod.php?pid=1077, 2 pages.

* cited by examiner

*Primary Examiner* — Fred I Ehichioya
(74) *Attorney, Agent, or Firm* — Hope Baldauff Hartman LLC

(57) ABSTRACT

Tools and techniques are described for automatically capturing and maintaining versions of documents. These tools may provide methods that include receiving documents from a server, and receiving indications of revisions to the documents at client systems. The methods may also automatically determine whether to capture representations of states of the documents before entry of the revisions, in the absence of explicit user commands to capture these representations.

9 Claims, 8 Drawing Sheets

US 7,974,948 B2

AUTOMATICALLY CAPTURING AND MAINTAINING VERSIONS OF DOCUMENTS

BACKGROUND

Several different consumer or enterprise applications currently support manual versioning capabilities. In these applications, respective users may issue explicit commands to create a version of a document at a given time. In turn, these applications may maintain version histories for such documents, listing a linear sequence of versions that were manually created in response to explicit commands from the users.

SUMMARY

Tools and techniques are described for automatically capturing and maintaining versions of documents. These tools may provide methods that include receiving documents from a server, and receiving indications of revisions to the documents at client systems. The methods may also automatically determine whether to capture representations of states of the documents before entry of the revisions, in the absence of explicit user commands to capture these representations.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
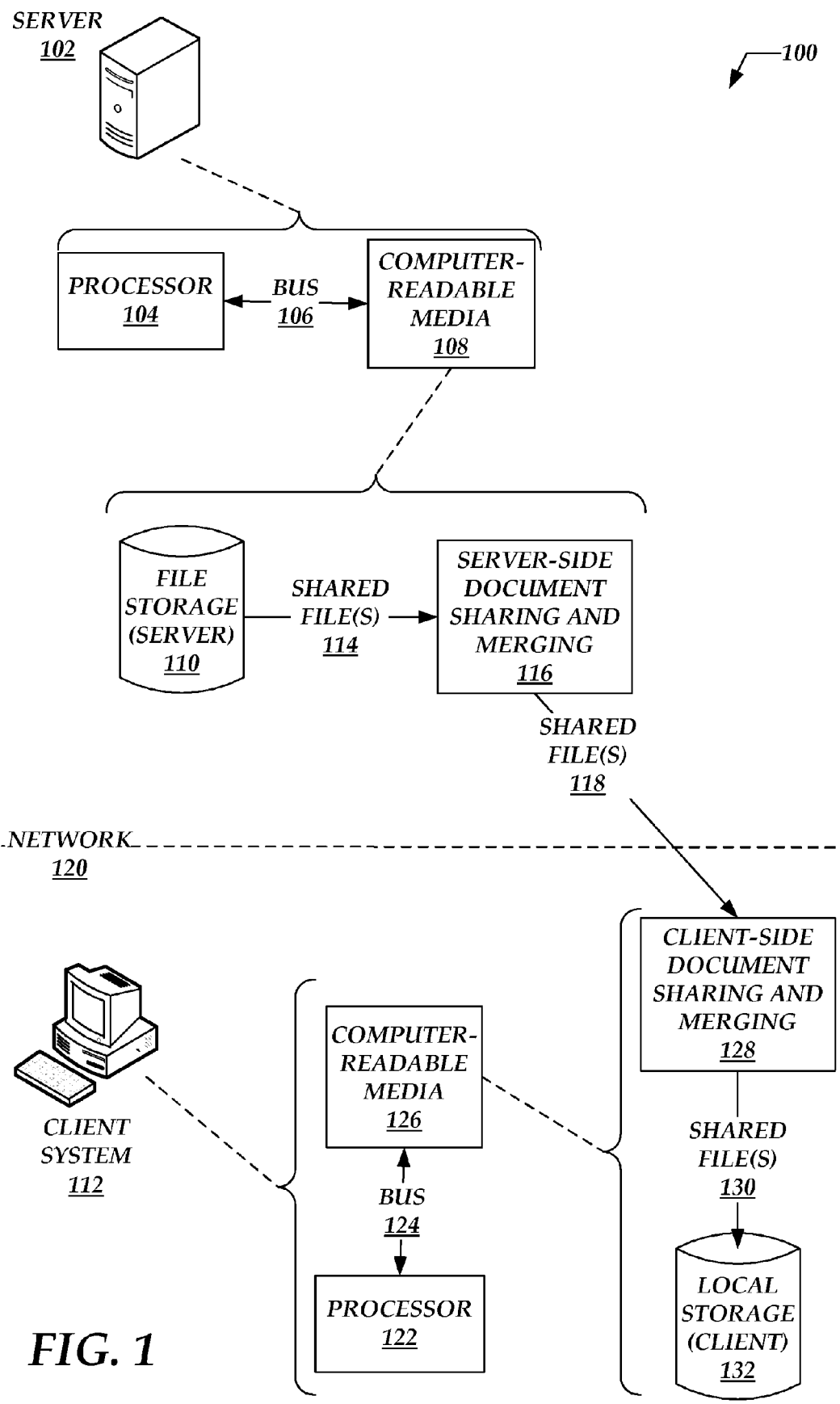
FIG. 1 is a combined blocking flow diagram illustrating systems or operating environments for automatically capturing and maintaining versions of documents.

The following detailed description is directed to technologies for automatically capturing and maintaining versions of documents. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for automatically capturing and maintaining versions of documents will be described.

FIG. 1 illustrates systems or operating environments, denoted generally at 100, for automatically capturing and maintaining versions of documents. These systems 100 may include one or more server systems 102, with FIG. 1 providing one example of a server. However, implementations of the description herein may include any number of servers.

Turning to the servers 102 in more detail, the servers may include one or more processors 104, which may have a particular type or architecture, chosen as appropriate for particular implementations. The processors 104 may couple to one or more bus systems 106 chosen for compatibility with the processors 104.

The servers 102 may also include one or more instances of computer-readable storage media 108, which couple to the bus systems 106. The bus systems may enable the processors 104 to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more modules of instructions that, when loaded into the processor 104 and executed, cause the server 102 to perform various techniques for automatically capturing and maintaining versions of documents. As detailed throughout this description, these servers 102 may provide these services using the components, process flows, and data structures described and illustrated herein.

The computer-readable media 108 may include one or more storage elements 110 that by a centralized storage facility that contains files that may be shared by and among a plurality of client systems 112 (described in further detail below). FIG. 1 denotes at 114 an example of these shared files, as extracted from the file storage 110 for distribution to one or more of the client systems 112.

The media 108 may also include one or more modules of software instructions, denoted generally at 116, that provide server-side applications or utilities for sharing or replicating the files or documents to the client systems. The modules 116 may also include instructions for receiving revisions to these documents from the client systems, and for merging these revisions as appropriate when different client systems provide revisions to the same document.

In general, the modules 116 may represent applications that sync versions between a plurality of client systems frequently, typically without clearly-defined save points or explicit commands issued by the users to capture and save versions. In some scenarios, multiple users may edit the same document simultaneously and asynchronously, with some users being online and other users being off-line. In some cases, the modules 116 may provide a versioning mechanism without also implementing a lock mechanism that grants exclusive access to a given document. Instead, the versioning mechanism may allow different client systems relatively unfettered access to the given document, while also automatically capturing versions based on a variety of different inputs. The modules 116 may provide a save mechanism by which users may explicitly request that a given document be saved, and instances of these save commands or requests may be inputs to the versioning mechanism. However, it is noted that points at which a given document is saved may not necessarily correspond to points at which versions of the given document are captured. In most implementations, the set of save points may be a superset of the set of version points. However, in scenarios in which "metadata" associated with changes (e.g., who made changes, when changes occurred, and the like) are of more interest than the actual content of the change, then some version points may not also be save points.

FIG. 1 denotes generally at 118 the files or documents as distributed from the server 102 to one or more client systems 112. As shown, the servers 102 and client systems 112 may communicate over one or more networks 120. These networks 120 may be personal, local area, regional, or global in scope, and may utilize any appropriate communications protocols suitable and different implementations. In addition, the networks 120 may include any number of sub-networks, and may include wired or wireless communications components.

Turning to the client systems 112 in more detail, the client systems may include one or more processors 122, which may have a particular type or architecture, chosen as appropriate for particular implementations. The type or architecture of the processors 122 in the client systems may or may not be the same as the type or architecture of the processors 104 in the servers. The processors 122 may couple to one or more bus systems 124 chosen for compatibility with the processors 122. In addition, the bus systems 124 within the client systems 112 may or may not be of the same type or architecture as the bus systems 106 in the servers.

The client systems 112 may also include one or more instances of computer-readable storage media 126, which couple to the bus systems 124. The bus systems may enable the processors 122 to read code and/or data to/from the computer-readable storage media 126. The media 126 may represent storage elements implemented using any suitable technology, including but not limited to semiconductors, magnetic materials, optics, or the like. The media 126 may include memory components, whether classified as RAM, ROM, flash, or other types, and may also represent hard disk drives.

The storage media 126 may include one or more modules of instructions that, when loaded into the processor 122 and executed, cause the client system 112 to perform various techniques for automatically capturing and maintaining versions of documents. As detailed throughout this description, these client systems 112 may provide these services using the components, process flows, and data structures described and illustrated herein.

The storage media 126 may include one or more modules of software instructions, denoted generally at 128, that provide client-side applications or utilities for receiving files or documents from the servers 102. The modules 128 may also include instructions for sending document revisions to the servers, which in turn may merge revisions to a given document, as received from different client systems.

FIG. 1 denotes at 130 examples of these shared files as sent by the server 102 and received by the client system 112. The storage media 126 may include local storage elements 132 for storing the shared files 130 on behalf of the client system 112. More specifically, the local storage elements 132 may store local revisions made at the client system, with at least some of these local revisions being synced back to the server as detailed further below. The term "revisions" as used herein may refer to the multiple versions of a given file that incorporate various changes made to the file by different users over time.

In some implementations, the local storage elements 132 may be implemented as an optimized single instance store. Such a store may contain an initial complete version of the file and then represents subsequent versions of the file as changes relative to the initial version, rather than storing multiple complete copies of the file. However, other implementations may rely instead upon the file system structure provided by the underlying operating system, rather than employing the optimized single instance store described here.

Having described the overall systems or operating environments 100 in FIG. 1, the discussion now turns to a description of illustrative hierarchies in which the shared files 114 may be organized, as well as version history information associated with these shared files. This description is now presented with FIG. 2.

Figure 2:
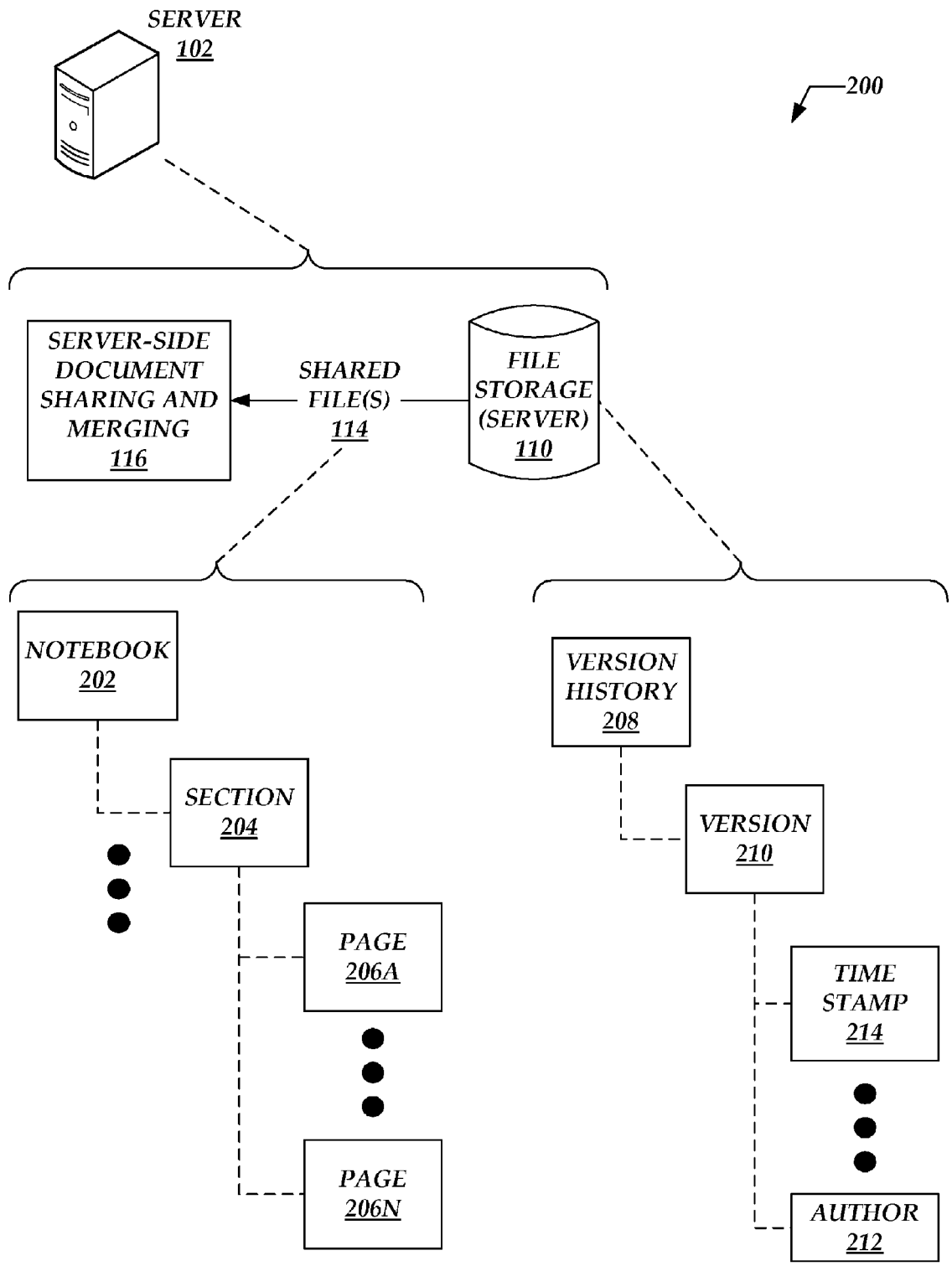
FIG. 2 is a block diagram illustrating data structures or hierarchies by which shared files may be organized, in addition to version history information associated with these shared files.

FIG. 2 illustrates data structures or hierarchies, denoted generally at 200, by which the shared files may be organized, in addition to version history information associated with these shared files. For ease of reference and description, but not to limit possible implementations, FIG. 2 may carry forward some reference numbers from previous drawings to refer to similar items. For example, FIG. 2 carries forward representations of the server 102, the server file storage 110, the shared files 114, and the server-side application modules 116.

Turning to the shared files 114 in more detail, in example implementations described here only as examples, these shared files may be organized into notebooks, denoted generally at 202. In turn, the notebooks may include one or more sections, denoted generally at 204. Different sections within a given notebook may include any number of pages, with two examples of pages denoted at 206a and 206n (collectively, pages 206). In some cases, the pages may be organized into smaller components, such as paragraphs, lines, or other suitable structures.

Having described the hierarchy shown in FIG. 2, it is noted that some implementations of the shared files 114 may incorporate hierarchies other than those shown in FIG. 2 without departing from the scope and spirit of this description. Some implementations may not organize the shared files 114 into any hierarchy at all.

The servers 102 may capture and maintain revisions to the shared files 114 at any suitable level of detail or granularity. For example, revisions may be captured and administered at a notebook level, a section level, a page level, or any other suitable level. For purposes of this discussion only, this description provides examples in which revisions are captured and maintained at the page level, but these examples do not limit possible implementations of this description. However, it is noted that other levels of granularity may be appropriate in different application domains. For example, in the context of word processors, spreadsheets, or the like, revisions may be captured and administered at the level of paragraphs, diagrams, sheets, regions, or the like.

As shown also in FIG. 2, version history information 208 may track a set of revisions associated with particular shared files. This version history information for a given shared file may be tracked at any suitable level of detail or granularity (e.g., notebook level, section level, page level, or the like).

Turning to the version history information in more detail, this history may include representations of a plurality of different versions corresponding to different revisions through which a given document may pass over time. FIG. 2 denotes an example individual version at 210, but it is understood that a given document may the associated with any number of individual versions or revision states. In turn, a given version 210 may be associated with, for example, author information 212 representing who authored the revision that led to the given version. In addition, the version information 210 may also be associated with timestamp information 214 indicating when the revision occurred. The version history 208 may also associate additional information with particular instances of versions 210, with the examples shown in FIG. 2 being illustrative rather than limiting.

In some cases, the server-side file storage 110 may contain and maintain the version history information associated with a particular shared file. In other cases, the version history information for a given shared file may be sent along with that shared file to different client systems. In still other cases, particular client systems may maintain their own local version history for a given file.

It is noted that the version history 208 may conserve storage space by avoiding duplication between successive versions of a given file. For example, in the "single instance" storage optimization described above, having stored a complete initial version of a given file, successive versions of the same file may store only changes (i.e., "deltas") to the initial version, rather than duplicating the entire file, including unchanged portions.

Having described the data structures or hierarchies and the version history information in FIG. 2, the discussion now proceeds to a description of illustrative components and data flows between a server and a client system in syncing revisions to a given shared file or document. This description is now provided with FIG. 3.

Figure 3:
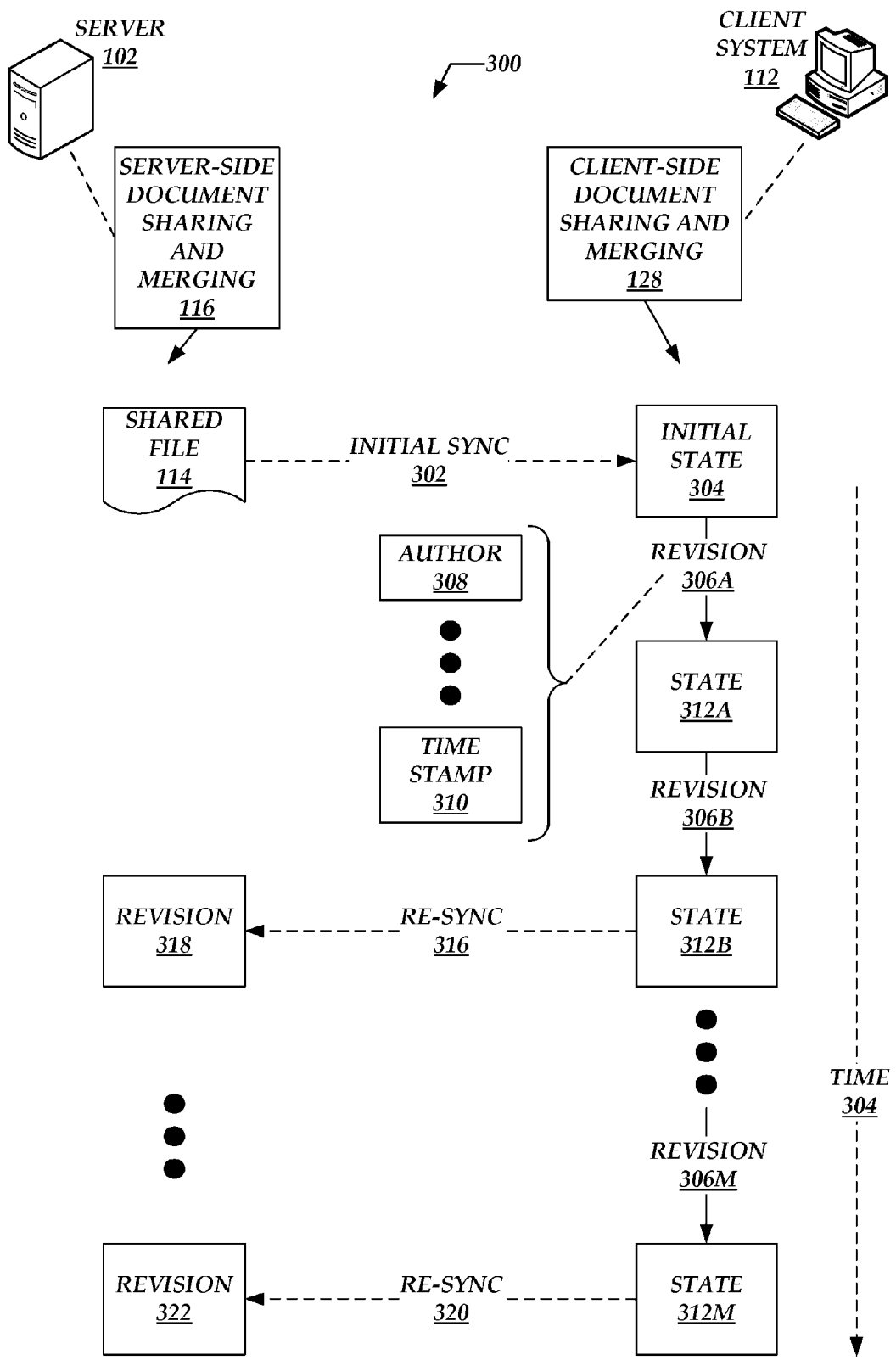
FIG. 3 is a combined block and flow diagram illustrating components and data flows for replicating revisions to a given shared file or document between a server and a client system.

FIG. 3 illustrates components and data flows, denoted generally at 300, for syncing revisions to a given shared file or document between a server and a client system. For ease of reference and description, but not to limit possible implementations, FIG. 3 may carry forward some reference numbers from previous drawings to refer to similar items. For example, FIG. 3 carries forward representations of the server 102 containing the server-side modules 116, the client system 112 containing the client-side modules 128, and the example shared file 114.

Turning to FIG. 3 in more detail, at a given time, an initial sync may occur, as represented generally at 302. in different scenarios, the server 102 may sync to one or more client systems 112, or the client systems may sync from the server. At the client system, block 304 represents an initial state in which the client system receives the file 114. At any point after receiving the file, a user associated with the client system may create one or more revisions to the file 114, with an initial set of these revisions represented at 306a. Examples of these revisions to the file may include deletions of existing content, additions of new content, alterations of existing content, or the like. Instances of such revisions may be associated with author information 308 indicating which client system and/or user created a given revision, as well as timestamp information 310 indicating when the given revision occurred.

In response to the revision 306a, the document as synced to the client system may transition to an updated state 312a. In turn, from the updated state 312a, additional revisions 306b may transition the document to an updated state 312b. Over time, as represented generally by a directed time axis 314, a user may enter any number of revisions to the file as synced to the client system 112. In general, a final revision 306m may result in a final state 312m of the document.

As different revisions 306a, 306b, and 306m (collectively, revisions 306) transition the shared file to different states 312a, 312b, and 312m (collectively, states 312), the client system may re-sync some, but not necessarily all, of these revisions back to the server 102. More specifically, the client-side module 128 may employ various algorithms described below to determine which of the revisions 306 to capture as versions that are synced back to the server. In the example shown in FIG. 3, an action 316 re-syncs the document state 312b back to the server, with the server receiving a state of the revised document as denoted generally at 318. In another example, an action 320 re-syncs the documents state 312m back to the server, with the server receiving a state of the revised document as denoted generally at 322.

The components and data flows shown in FIG. 3 may represent single-user scenarios, in which a given client system is the only client revising a given shared file 114. However, FIG. 3 may also represent multi-user scenarios, in which the client system 112 is one of several different client systems may be revising a given shared file 114. The term "file" as used herein may refer generically to a user-addressable file system container, rather than referring to a specific stream of bytes and bits arranged according to a particular organization scheme.

Having described the components and data flows in FIG. 3 for syncing revisions to a given shared file or document between a server and a client system, the discussion now turns to descriptions of scenarios in which multiple client systems may revise a given document. These descriptions are now provided with FIG. 4.

Figure 4:
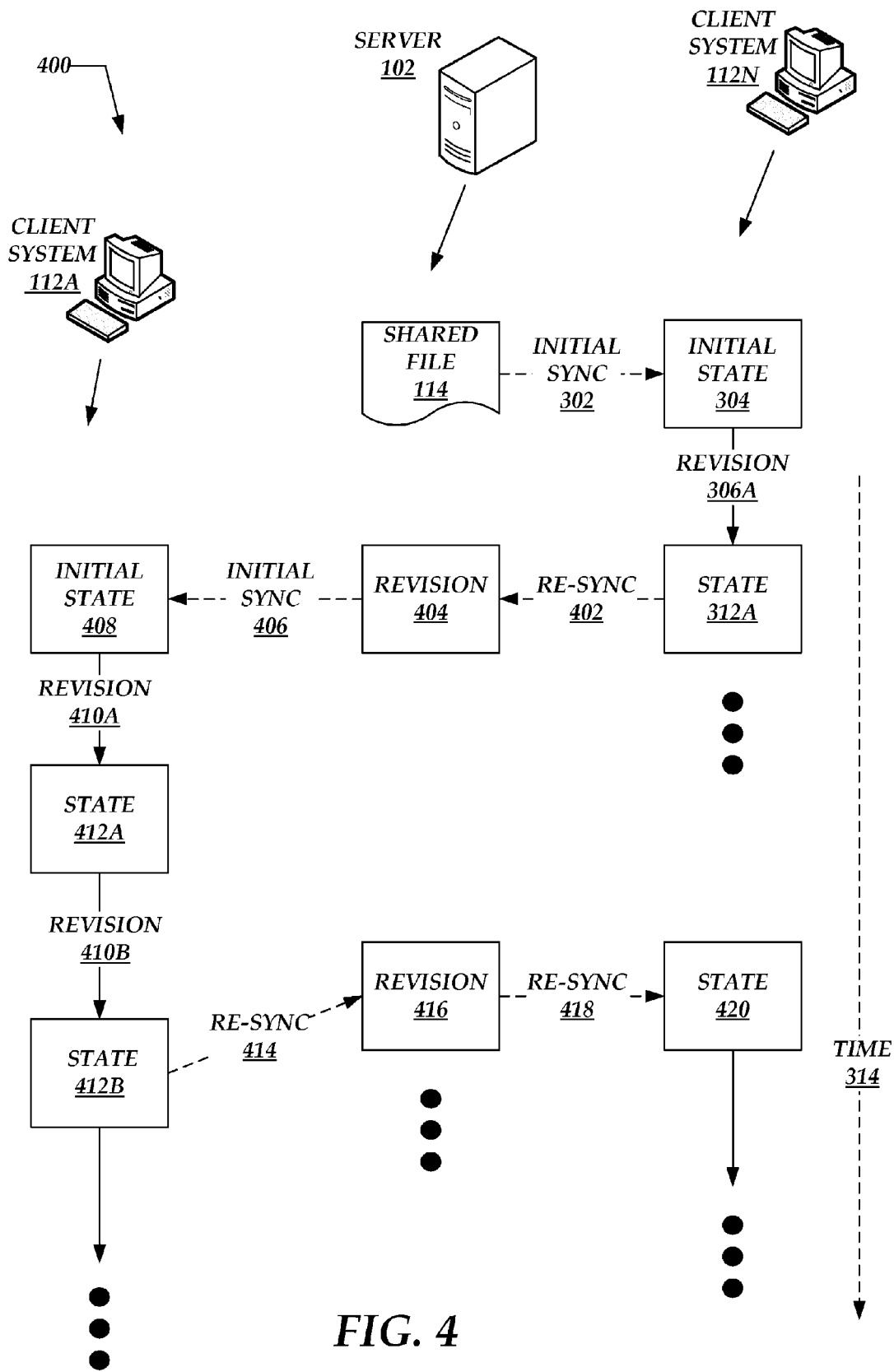
FIG. 4 is a combined block and flow diagram illustrating components and data flows providing scenarios in which multiple client systems may simultaneously revise a given document.

FIG. 4 illustrates components and data flows, denoted generally at 400, providing scenarios in which multiple client systems may simultaneously revise a given document. For ease of reference and description, but not to limit possible implementations, FIG. 4 may carry forward some reference numbers from previous drawings to refer to similar items. For example, FIG. 4 carries forward representations of the server 102, examples of client system 112a and 112n, and the example shared file 114.

Beginning at the server 102, the shared file 114 may be initially synced to one of the client systems (e.g., 112n), as carried forward at 302. In turn, the client system 112n may receive the shared file in an initial state, carried forward at 304. As described above, any number of revisions may occur at the client system 112n over time, as represented in the carried forward time axis 314. FIG. 4 denotes an example revision 306a that results in a state 312a.

In the example shown, the client system 112n may re-sync the state 312a back to the server 102, as represented at 402. For example, the revision 306a may result from a user acting through the client system 112*n* to insert or add content to the shared file 114. Accordingly, when the client system 112*n* re-syncs the revision 306*a* back to the server (e.g., 402), the server may contain a revision 404. in this example, the revision 404 represents the initial state of the shared file 114, combined with any added content from the client system 112*n*.

Continuing this example, another client system 112*a* may sync the revision 404 from the server 102. In this scenario, the client system 112*a* would receive the contents of the initial shared file 114, in addition to the added content from the other client system 112*n*. FIG. 4 denotes at 406 the initial sync from the server 102 to the client system 112*a*.

Turning to the client system 112*a*, the initial sync 406 may provide the shared file in an initial state 408, which is assumed to include the content added by the other client system 112*n*. From this initial stage 408, the client system 112*a* may revise the shared file as received from the server, as denoted generally at 410*a*. In response to the revisions 410*a*, the initial state 408 may transition to a revised state 412*a*. Subsequent revisions 410*b* may transition to a revised state 412*b*. for the purposes of this description, the revision 410*a* may represent altering at least part of the content added by the other client system 112*n*, and the revision 410*b* may represent the leading at least part of the content added by the other client system 112*n*.

As indicated in FIG. 4, the client system 112*a* may re-sync the updated state 412*b* back to the server 102, as denoted at 414. At the server, the revision resulting from the re-sync 414 is denoted at 416. In turn, the client system 112*n* may re-sync the revision 416 from the server, as denoted at 418. In addition, since the re-synch 402, the client system 112*n* may have continued to receive revisions to the given shared file, in parallel with the revisions performed by the other client system 112*a* to the given shared file. Thus, the revision history of the shared file may or may not be linear. In some cases, the revision history may include branches or forks, in which multiple users are editing the given shared file simultaneously on different client systems.

At the client system 112*n*, a state 420 represents the revision 416 resulting from the re-sync 418. in this example, the state 420 at the client system 112*n* may represent that results of the previous revision 306*a* at the client system 112*n* (which added content), as well as the results of the revisions 410*a* and 410*b* at the client system 112*a* (which altered and deleted at least part of the added content). Accordingly, a user accessing the client system 112*n* may review the revision history associated with the state 420, and determined that at least some of the content added during the revision 306*a* has now been altered and/or deleted by the other client system 112*a*.

To address this example scenario, and other possible scenarios, the discussion now turns to a description of process flows by which server and/or client systems may determine which revisions occurring locally on client systems are to be synced. This discussion is now presented with FIG. 5, along with discussions of overall process flows for automatically capturing and maintaining versions of documents.

Figure 5:
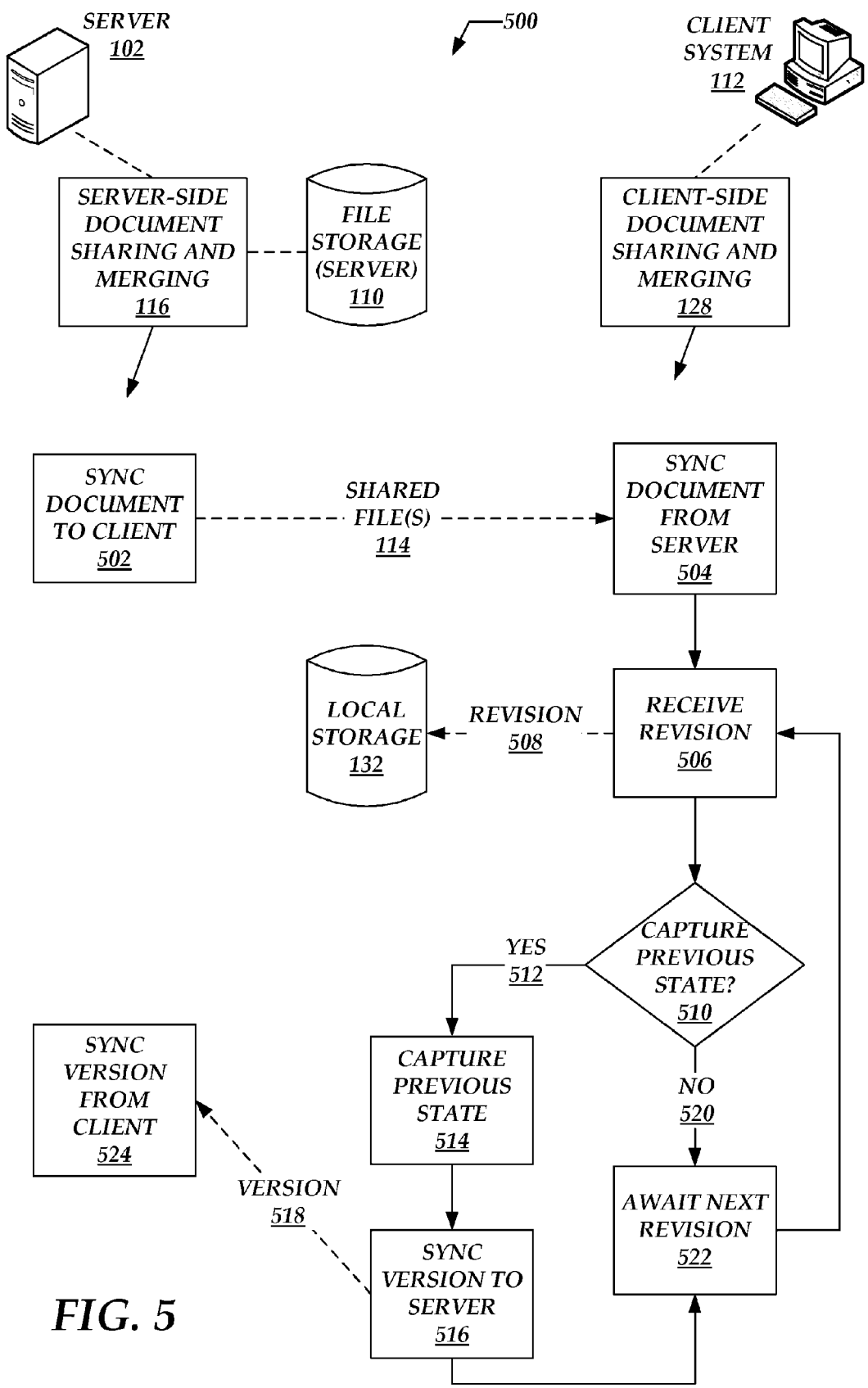
FIG. 5 is a flow diagram illustrating processes by which servers and/or client systems may automatically capture and maintain versions of documents.

FIG. 5 illustrates process flows, denoted generally at 500, by which servers and/or client systems may automatically capture and maintain versions of documents. For ease of reference and description, but not to limit possible implementations, FIG. 5 may carry forward some reference numbers from previous drawings to refer to similar items. For example, FIG. 5 carries forward representations of the server 102 containing the server-side modules 116 and the file storage 110, as well as the client system 112 and the client-side modules 128.

In addition, for convenience of description only, but not to limit possible implementations, respective portions of the process flows 500 are described as being performed by the server 102 or the client system 112. However, it is noted that components other than the server 102 or the client system 112 may perform portions of the process flows 500, without departing from the scope and spirit of this description.

Turning to the process flows 500 in more detail, beginning at the server 102, block 502 generally represents syncing at least one shared file from the server to at least one client system. FIG. 5 carries for an example shared file at 114.

At the client system 112, block 504 generally represents receiving the synced file from the server system 102. In turn, block 506 generally represents receiving indications of one or more revisions at the client system. FIGS. 3 and 4 provide examples of such revisions as shown generally at 306. As described above, examples of such revisions may include adding content, revising content, deleting content, or other similar operations to the shared file. In addition, a given user may revise content that he or she originally authored, or may revise content authored by other users. Block 506 may include storing representations of these revisions into local storage 132, as represented generally at 508.

Having received an indication of a given revision, block 510 generally represents determining whether to capture a revision or a snapshot that represents a previous state of the shared document or file, before entry of the given revision. Block 510 may include determining whether to sync the previous state of the shared document or file, before entering the given revision. Put differently, block 510 may represent determining whether to create a version of the previous state of the shared document, and to sync this version to the server.

Figure 6:
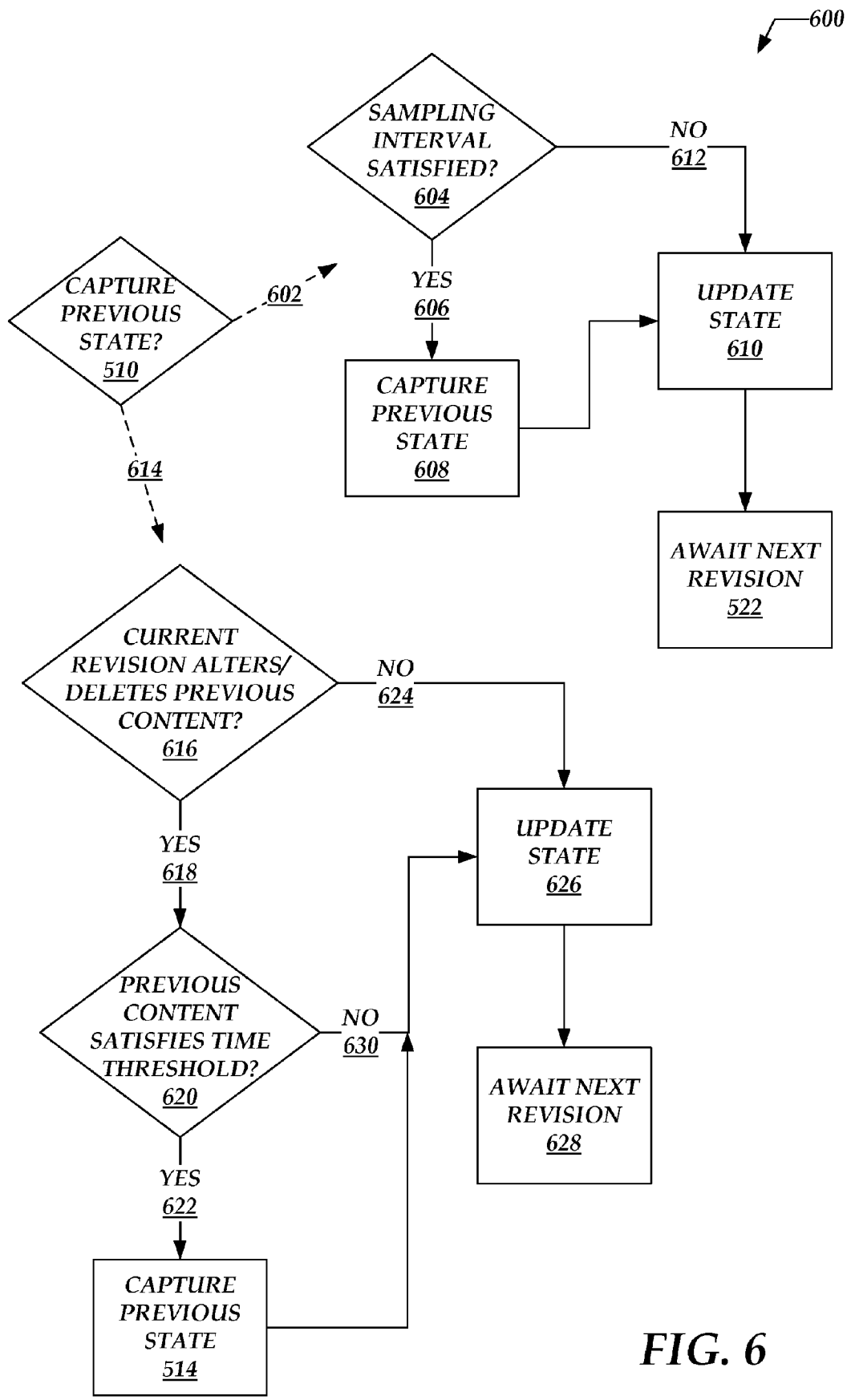
FIG. 6 is a flow diagram illustrating techniques and algorithms for determining whether to version or capture a previous state of a document or file, having received a revision to the document or file.
Figure 7:
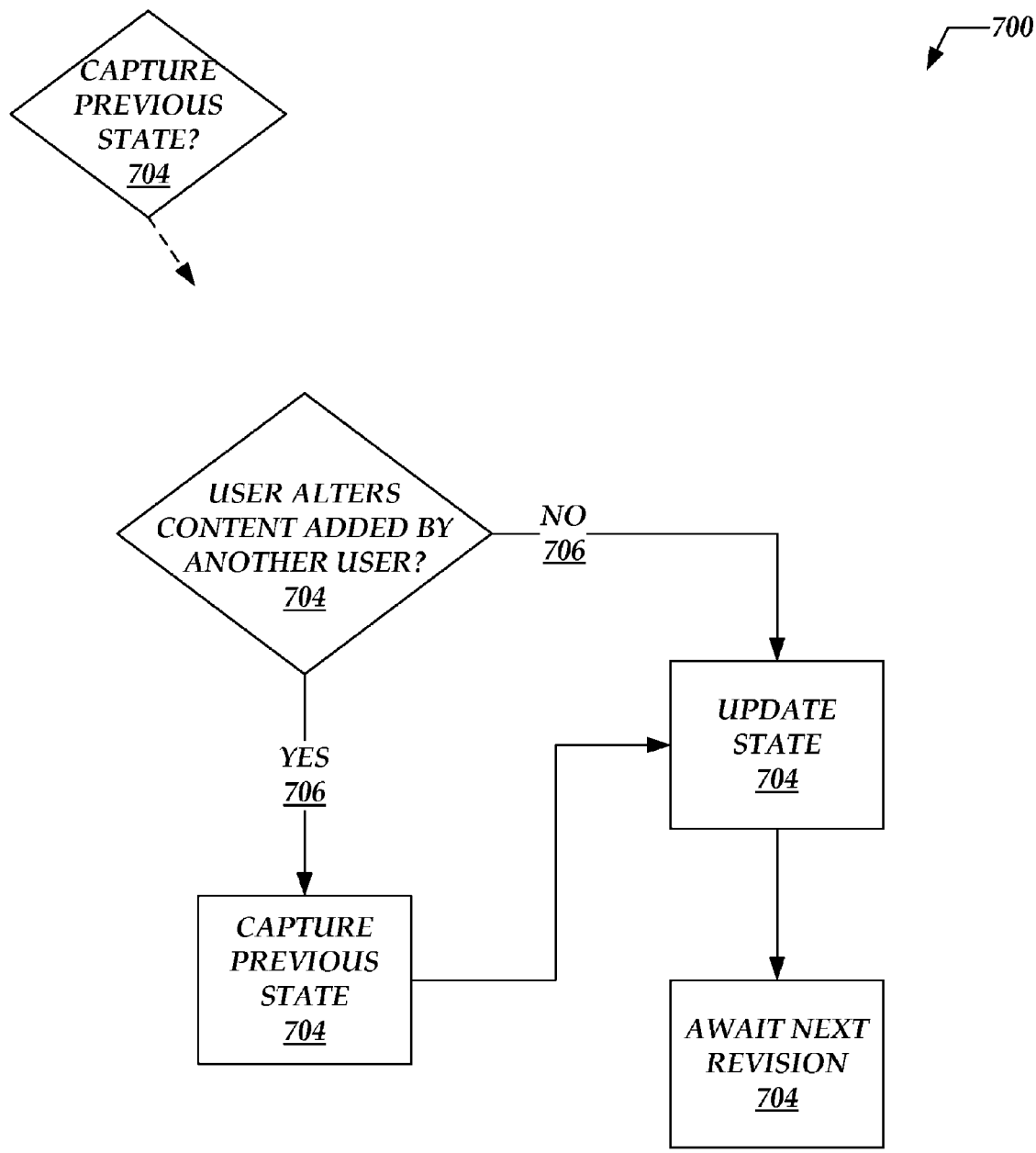
FIG. 7 is a flow diagram illustrating additional processes for determining whether to capture a previous state of a document.

FIGS. 6 and 7 illustrate various techniques and algorithms for making this determination, and are described in more detail below. However, for the purposes of describing FIG. 5, if block 510 determines to capture the previous state of the document, the process flows 500 may take Yes branch 512 to block 514, which represents capturing the previous state of the document as a version or revision. In turn, block 516 represents syncing the version back to the server. FIG. 5 generally represents the version as synced back to the server at 518.

Returning to decision block 510, if this block determines not to capture or version the previous state of the document, the process flows 500 may take No branch 520 to block 522, which represents awaiting a next revision at the client system. In this manner, if the process flows 500 determine not to capture or version a previous state of the document, the process flows may bypass blocks 514 and 516. The process flows 500 may also reach block 522 after performing block 516. When a new revision arrives at the client system 112, the process flows 500 may advance from block 522 to block 506, and then repeat the decision block 512. At the server, block 524 generally represents syncing the version 518 as received from the client system 112.

Having described the overall process flows 500 for automatically capturing and maintaining versions of documents, the discussion now turns to a more detailed description of techniques and algorithms for determining whether to version or capture a previous state of a document or file, having received a revision to the document or file. This discussion is now presented with FIG. 6.

FIG. 6 illustrates techniques and algorithms, denoted generally at 600, for determining whether to version or capture a previous state of a document or file, having received a revision to the document or file. The various techniques and algorithms 600 shown in FIG. 6 may elaborate further on processing represented by decision block 510, as shown in FIG. 5 and carried forward into FIG. 6.

Turning to the techniques and algorithms 600 in more detail, these algorithms may include process flows 602 may include establishing a sampling interval applicable to versioning or capturing revisions of a given file at a client system. At the expiration of the sampling interval, the client system may version the current state of the file, and may sync this version back to the server. Sampling intervals may be chosen and adjusted as appropriate for different implementations. Shortening the sampling intervals may result in capturing more versions of the given file, providing increased granularity in versions, at a cost of increased storage, at least until the pruning operations shown in FIG. 8 below operate. Capturing too many versions may present a user interface (UI) challenge, in the sense that only so many versions may be presented to a user at a given time. Conversely, lengthening the sampling intervals may result in capturing fewer versions of the given file, and may present fewer UI challenges. However, versions of the document may be captured to coarsely, thereby missing some relevant versions.

As shown in FIG. 6, decision block 604 represents determining whether this sampling interval has been satisfied at a given time. For example, when a given revision arrives at the client system, block 604 may include determining whether the applicable sampling interval has expired. If so, the process flows 602 may take Yes branch 606 to block 608, which represents capturing or versioning a previous state of the document. Afterwards, the process flows 602 may proceed to block 610, which represents updating the state of the document to incorporate the given revision. In this manner, the process flows 602 may preserve the previous state of the document before entering the given revision.

Returning to decision block 604, if the sampling interval is not yet expired when a given revision occurs, the process flows at 602 may take No branch 612 to block 610, which was described above. In turn, the process flows 602 may proceed to block 522 to await the next revision at the client system.

Process flows 614 may divide further examples of the algorithms and techniques 600. Turning to the process flows 614 in more detail, decision block 616 generally represents evaluating whether a current revision alters and/or deletes content previously added to a given file. If so, the process flows 614 may take Yes branch 618 to decision block 620, which represents evaluating whether the previous content has existed in the file long enough to satisfy an applicable time threshold. More specifically, block 620 may consider whether the previous content is sufficiently long-lived to justify snapping a revision of this content. In some implementations, the longer that a given instance of content has been in the file, the more importance that various users may attach to this content. Accordingly, if a given revision in some way alters existing content, the process flows 614 may consider whether this existing content is long-lived.

Turning to decision block 620, if the existing or previous content satisfies an applicable time threshold, the process flows 614 may take Yes branch 622 to block 514, which was carried forward from FIG. 5 and represents capturing or versioning the previous state of the document. In this manner, the process flows 614 may version the previous state of the document in cases where a given user alters or revises existing content that is sufficiently long-lived.

Returning to decision block 616, if the output of this decision block is negative (i.e., the current revision does not alter or delete previous or existing content), the process flows 614 may take No branch 624 to block 626. Block 626 represents updating the state of the document to incorporate the current revision. The processing represented in block 626 may be similar to that represented in block 610. However, these two blocks are referenced separately to avoid confusion, but not to limit possible implementations of this description. In turn, the process flows 614 may proceed from block 626 to block 628, which represents awaiting a next revision (similarly to block 522).

Returning to decision block 620, if the output of this decision block is negative (i.e., the current revision alters or deletes previous content that is not sufficiently long-lived), the process flows 614 may take No branch 630 to block 626. In effect, if the process flows 614 take either of No branches 624 or 630, then the process flows 614 bypass block 514 and do not capture the previous state of the document.

FIG. 7 illustrates additional aspects of process flows, denoted generally at 700, provided by algorithms and techniques for determining whether to capture a previous state of a document, elaborating further on process flows represented in decision block 510. Turning to the process flows 700 in more detail, decision block 702 represents determining whether a current revision alters content to the document added by another user. For example, recalling the scenario presented in FIG. 4, a first user may add content to a document using the client system 112*n*, and a second user may alter or delete this content of the document using the client system 112*a*. This scenario may provide a negative experience for the first user. However, one goal of the algorithms and techniques described herein may be to provide users with some assurance that their content will be preserved in later revisions of the document. In a multi-user scenario, for example, if a second user deletes content added by a first user, the first user may recover the deleted content by traversing the revision history of the document.

From decision block 702, if the revision alters content added by another user, the process flows 700 may take Yes branch 704 to block 514, which is carried forward from FIGS. 5 and 6 to represent capturing a previous state of the content or document. In turn, the process flows 700 may proceed to block 610, which is carried forward from FIG. 6 to represent updating a state of the content or the document to incorporate the current revision. Finally, the process flows 700 may proceed to block 522, which is carried forward from FIG. 5 to represent awaiting a next revision from the client system.

Returning to decision block 702, if the current revision does not alter content added by another user, the process flows 700 may take No branch 706 directly to block 610. In this manner, the process flows 700 may bypass block 514 if the current revision does not alter content added by another user.

Having described the various algorithms and techniques shown in FIGS. 6 and 7, several observations are now noted. As stated previously, these algorithms and techniques elaborate further on determining whether to capture a previous state of document or file content, having received a given revision to that content. Put differently, these algorithms and techniques elaborate further on decision block 510 shown in FIG. 5.

Only for clarity of illustration and description, these various algorithms and techniques are discussed separately. Summarizing previous description, the process flows 602 shown in FIG. 6 illustrate how sampling intervals may be considered in determining when and whether to capture or version a previous state. The process flows 614 shown in FIG. 6 illustrate scenarios in which the current revision alters existing content, while also considering how long that existing content has existed in the document. Finally, the process flows 700 shown in FIG. 7 illustrates scenarios in which one user alters (e.g., deletes or modifies) existing content added by another user.

It is noted that implementations of this description may combine these different algorithms and techniques as may be suitable in different scenarios. For example, implementations may operate the process flows 602, 614, and/or 700 in parallel on a given revision, thereby simultaneously applying the factors considered in those process flows to the given revision. More specifically, for a given current revision, these implementations may evaluate the status of an applicable sampling interval, may consider the duration of any existing content affected by the current revision, and/or may consider whether the current revision affects content authored by a different user.

As an example of the foregoing, recovering to a previous state in the document by traversing a number of individual revisions may be tedious. in some cases, the user may return to a previous state in the document by directly accessing one of the versions captured in a periodic snapshot, rather than recovering the previous state by traversing a sequence of intermediate states and reconstructing each one.

The previous discussion has described scenarios in which the above description determines whether to capture or version the previous document state on-the-fly as revisions arrive from the client systems. However, implementations of this description may also make these versioning determinations in a post-processing analysis, performed after the revisions arrive.

Having described the foregoing algorithms and techniques for determining whether to version or capture a previous state of document content, the discussion now turns to a description of process flows for pruning these versions in a post-processing analysis. This description is now presented with FIG. 8.

Figure 8:
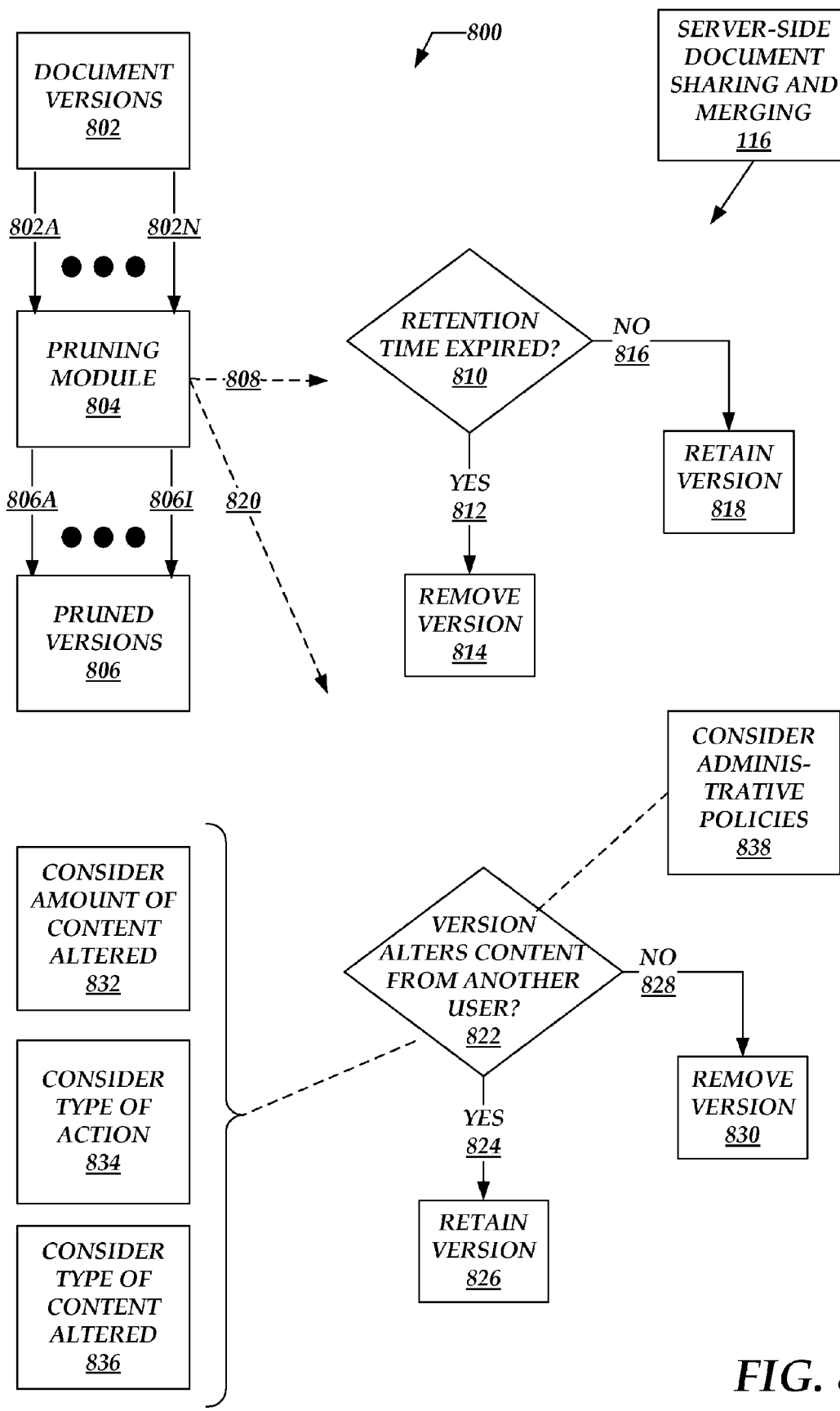
FIG. 8 is a flow diagram illustrating processes for pruning versions or revisions in a post-processing analysis.

FIG. 8 illustrates process flows, denoted generally at 800, for pruning versions or revisions in a post-processing analysis. For ease of reference and description, but not to limit possible implementations, FIG. 8 may carry forward some reference numbers from previous drawings to refer to similar items. For example, FIG. 8 carries forward the server-side modules 116 as example components that may perform at least portions of the process flows 800. However, it is noted that client-side modules (e.g., 128) may also perform at least portions of the process flows 800 to prune versions maintained locally at client systems.

Turning to FIG. 8 in more detail, the server-side modules 116 (as well as client-side modules, in some implementations) may store or contain a plurality of document versions, denoted generally at 802. Examples of individual document versions are provided at 802a and 802n, but implementations of this description may include any number of document versions. A pruning module 804 may receive these document versions 802, and may employ the algorithms and techniques shown in FIG. 8 to determine which of the document versions to retain at any given time. FIG. 8 notes retained versions generally at 806, and provides examples of individual retained document versions at 806a and 806i. Generally, the set of retained versions 806 is a subset of the incoming document versions 802.

The pruning module 804 may employ various algorithms and techniques to determine which of the incoming document versions 802 to retain any given time. For example, process flows 808 may apply retention periods to the document versions. More specifically, decision block 810 generally represents determining whether an applicable retention period has expired at a given time for one or more given document versions 802. If the applicable retention period has expired, the process flows 808 may take Yes branch 812 to block 814, which represents removing or pruning the given version. Returning to decision block 810, if the applicable retention period has not expired for the given document versions, the process flows 808 may take No branch 816 to block 818, which represents retaining the given version.

Previous versions may be retained at varying levels of granularity, depending on how "fresh" or "stale" these versions are. For example, document versions that are relatively recent may be stored in retained at a higher level of granularity (e.g., retain multiple versions per day), as compared to document versions that are older (e.g., retain a final version per day). As document content continues to age over time, the granularity may be reduced further (e.g., retain a final version per week or per month). Eventually, document content may be deleted altogether after expiration of the retention period.

The pruning module 804 may employ process flows 820 in addition to, or instead of, the process flows 808, in whole or in part. Turning to the process flows 820 in more detail, decision block 822 generally represents determining whether a given version alters content authored by another user. More specifically, if a given version results from revisions made by a first user, block 822 represents determining whether this revision alters content authored originally by a different user. If the output of decision block 822 is affirmative, then the process flows 820 may take Yes branch 824 to block 826, which represents retaining the version under consideration. As described above in FIG. 7, one goal of some implementations of this description may be to provide users with some level of assurance that their authored content will be retained, despite deletions or revisions made by other users. Accordingly, decision block 822 and block 826 may consider whether such a scenario exists, and if so, may retain such versions for the benefit of the original authors of these versions.

Returning to decision block 822, if the output of this decision block is negative, the process flows 820 may take No branch 828 to block 830. Block 830 represents removing or pruning the version under consideration.

Having described the general processing represented in decision block 822, the discussion now turns to a description of additional factors that may be considered in block 822. For example, block 822 may include considering an amount of content altered in the revision that resulted in a given document version, as represented generally in block 832. More specifically, if a given version corresponds to a revision that altered a relatively significant amount of existing content, then block 822 may determine to retain the given version, and may also retain the previous version as well.

As another example, block 822 may include considering a type of action that resulted in a given version, as represented generally at 834. More specifically, versions that result from particular actions may be retained longer than versions that result from other actions. For example, those actions that result in branches or forks in a version tree may be retained longer than actions that do not result in such branches or forks. More specifically, sync points in the version tree at which branches or forks occur may provide a convenient basis for subsequent merge operations, in which revisions made by multiple different users are combined at the server. Block 834 may also include capturing and retaining versions when users sync with the server.

As represented in block 836, block 822 may include considering the type of content altered in a given version. For example, block 836 may include considering the subject matter within a given document that is altered in a given version.

Block 838 represents considering administrative policies that govern the retention of particular documents, or versions thereof. The processing represented in block 838 may, in some cases, relate to the processing represented in block 836. For example, administrative policies may specify retention periods applicable to documents pertaining to certain subject matter, or that have been authored or reviewed by a certain specified personnel. More specifically, these administrative retention policies may enable compliance with corporate procedures, governmental regulations, contractual obligations, or the like. As a non-limiting example, blocks 836 and/or 838 may include applying a retention period to any document where financial matters are discussed, where certain executive personnel author the document, review or comment on the document, or the like. in some cases, administrative policies may override, or have higher weight than, other factors shown in FIG. 8.

The foregoing examples of pruning algorithms presented in FIG. 8 are provided only for example, but not to limit possible implementations. Particular aspects of these pruning algorithms may also be combined and integrated as appropriate for particular applications. For example, more sophisticated pruning algorithms may consume more processing resources than simpler algorithms, but may result in more optimal version retention over time (e.g., by reducing storage). Implementations of this description may include heuristic analysis of any of the factors described herein.

CONCLUSION

Having provided the above description, several observations are now noted. The drawings and descriptions thereof are resented in certain orders only for the convenience of description, but not to limit possible implementations. Regarding flow diagrams, the individual processes shown within these diagrams may be performed in orders other than those shown herein without departing from the scope and spirit of this description.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. At least one computer-readable storage medium having computer-executable instructions stored thereon which, when executed by a computer, cause the computer to perform a method comprising:
   receiving at least one document from a server, wherein the server is for communicating with a plurality of client systems that are remote from the server;
   receiving an indication of at least one revision to the document, as provided by a first user interacting with one of the client systems;
   determining automatically whether to capture a representation of a previous state of the document before entry of the revision, without an explicit user command to capture the representation;
   capturing the representation of the previous state of the document in response to determining that the revision alters existing content added previously to the document by at least a second user; and
   evaluating how long the existing content has been in the document, in determining whether to capture the representation of the previous state of the document.

2. The storage medium of claim 1, wherein instructions for capturing the representation of the previous state of the document include instructions for determining that the revision deletes or modifies content added to the document by the second user.

3. The storage medium of claim 1, further comprising instructions for syncing the representation of the previous state of the document to the server.

4. The storage medium of claim 1, further comprising instructions for updating the previous state of the document to incorporate the revision.

5. The storage medium of claim 1, further comprising instructions for evaluating a sampling interval applicable to capturing representations of states of the document.

6. At least one computer-readable storage medium having computer-executable instructions stored thereon which, when executed by a computer, cause the computer to perform a method comprising:
   receiving representations of a plurality of versions of at least one document, wherein a server system distributes the document to at least one client system, and receives the versions of the document from the client system in the absence of explicit user commands to capture the versions;
   determining which of the versions of the document to retain, wherein instructions for determining which of the versions to retain include instructions for evaluating whether a retention period applicable to the versions has expired and instructions for evaluating how much pre-existing content in the document is altered by the versions; and
   wherein the instructions for determining which of the versions to retain include instructions for evaluating whether the versions correspond to document revisions created by a first user that alter existing content in the document, wherein the existing content is created by a second user.

7. The storage medium of claim 6, wherein the instructions for determining which of the versions to retain include instructions for evaluating types of actions represented in the versions.

8. The storage medium of claim 7, wherein the instructions for evaluating types of actions include instructions for identifying actions that result in branches or forks in a version tree representing the versions.

9. The storage medium of claim 6, wherein the instructions for determining which of the versions to retain include instructions for evaluating at least one administrative policy applicable to the versions.

\* \* \* \* \*